(12) United States Patent
Haldeman

(10) Patent No.: US 8,494,124 B2
(45) Date of Patent: Jul. 23, 2013

(54) NOTIFICATION SYSTEMS AND METHODS

(75) Inventor: Randolph M. Haldeman, Menlo Park, CA (US)

(73) Assignee: Apptera, Inc., Sunnyvale, CA (US)

( * ) Notice: Subject to any disclaimer, the term of this patent is extended or adjusted under 35 U.S.C. 154(b) by 642 days.

(21) Appl. No.: 12/432,684

(22) Filed: Apr. 29, 2009

(65) Prior Publication Data
US 2009/0274278 A1   Nov. 5, 2009

Related U.S. Application Data

(60) Provisional application No. 61/126,167, filed on Apr. 30, 2008.

(51) Int. Cl.
H04M 1/64       (2006.01)

(52) U.S. Cl.
USPC ........................... 379/88.12; 379/93.12

(58) Field of Classification Search
USPC ................... 379/88.11, 88.12, 93.12, 114.13
See application file for complete search history.

(56) References Cited

U.S. PATENT DOCUMENTS

| 5,761,650 | A  | * | 6/1998  | Munsil et al. ............... 705/34     |
| 6,088,429 | A  | * | 7/2000  | Garcia ..................... 379/88.22   |
| 6,169,911 | B1 | * | 1/2001  | Wagner et al. .............. 455/566     |
| 6,760,412 | B1 | * | 7/2004  | Loucks ..................... 379/88.13   |
| 6,868,143 | B1 | * | 3/2005  | Menon et al. ............... 379/88.13   |
| 7,150,031 | B1 | * | 12/2006 | Rodriguez et al. ............ 725/58     |
| 7,257,200 | B2 | * | 8/2007  | Valeriano et al. ........... 379/88.12   |
| 7,996,481 | B2 | * | 8/2011  | Stillman et al. .............. 709/207   |
| 2003/0030751 | A1 | * | 2/2003 | Lupulescu et al. ............ 348/552    |
| 2003/0087665 | A1 | * | 5/2003 | Tokkonen ..................... 455/556    |
| 2004/0066924 | A1 | * | 4/2004 | Wertsberger ............. 379/201.01      |
| 2004/0091093 | A1 | * | 5/2004 | Bookstaff ................. 379/201.01    |
| 2004/0122941 | A1 | * | 6/2004 | Creamer et al. ............. 709/224      |
| 2004/0131162 | A1 | * | 7/2004 | Silver et al. .............. 379/88.12    |
| 2005/0260974 | A1 | * | 11/2005 | Lee et al. .................. 455/412.2   |
| 2006/0171520 | A1 | * | 8/2006 | Kliger ..................... 379/218.01    |
| 2007/0036299 | A1 | * | 2/2007 | Marsh et al. ............... 379/88.22    |
| 2007/0071184 | A1 | * | 3/2007 | Clift et al. ................. 379/88.01  |
| 2007/0203736 | A1 | * | 8/2007 | Ashton ...................... 705/1       |
| 2007/0274486 | A1 | * | 11/2007 | Kister ..................... 379/142.06   |
| 2008/0189153 | A1 | * | 8/2008 | Haldeman .................... 705/7       |
| 2008/0212765 | A1 | * | 9/2008 | Wolmuth et al. ........ 379/218.01        |
| 2010/0312640 | A1 | * | 12/2010 | Haldeman et al. ......... 705/14.49      |

* cited by examiner

Primary Examiner — Olisa Anwah
(74) Attorney, Agent, or Firm — Steven R. Sponseller; Stevens Law Group

(57) ABSTRACT

Notification systems and methods receive a call from a caller and prompt the caller to identify an event. A response is received from the caller which identifies a particular event. The notification systems and methods select an advertisement related to the particular event, the selected advertisement being associated with a second event of the same type as the particular event. The caller is prompted whether a reminder message associated with the second event is desired. A response is received from the caller regarding the reminder message. If the caller desires to receive a reminder message, that reminder message is scheduled.

11 Claims, 6 Drawing Sheets

NOTIFICATION SYSTEMS AND METHODS

RELATED APPLICATIONS

This application claims the priority benefit of U.S. Provisional Patent Application 61/126,167, filed Apr. 30, 2008, the disclosure of which is incorporated by reference herein.

BACKGROUND

The systems and methods described herein permit the identification of events, products, services and so forth that are related to a transaction with a customer (e.g., a caller), and offering to provide one or more notifications to the caller regarding the related event, product, service, etc.

The use of mobile communication devices, such as cellular phones and handheld computers, is expanding rapidly. These devices provide new opportunities for users to communicate with other users and organizations. Additionally, the increased use of mobile communication devices provides new opportunities for organizations to communicate with clients, customers and other users.

Existing systems permit users of mobile communication devices to contact organizations to retrieve information, such as event schedules and related information. These interactions are initiated by the user of the mobile communication device. With these systems, the user is responsible for initiating a communication to obtain the event schedules and related information.

BRIEF DESCRIPTION OF THE DRAWINGS

Throughout the description, similar reference numbers may be used to identify similar elements.

DETAILED DESCRIPTION

Figure 1:
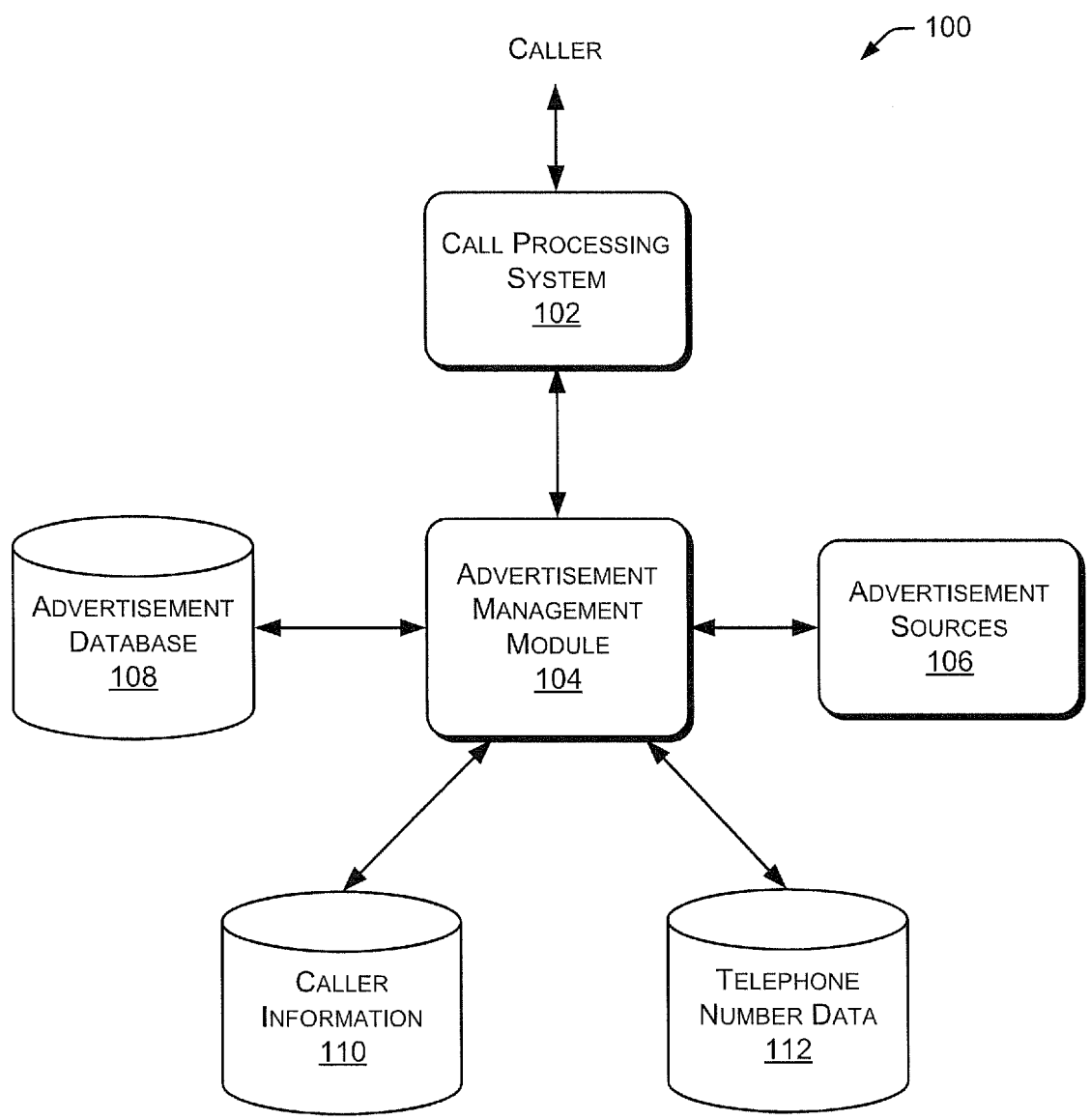
FIG. 1 depicts a block diagram of an example environment for handling incoming calls and providing advertisements and other information to callers.

The systems and methods described herein provide a system and method for identifying events, products, services, etc. that are related to a transaction with a caller, and offering to provide one or more notifications to the caller regarding the related event, product, service, etc.

In certain embodiments, the described systems and methods allow an advertiser (such as a movie studio, movie distributor, television network, or product manufacturer) to notify any number of customers (or other interested individuals) at substantially the same time. This notification can be related to a movie introduction, a television program, a sporting event, or a new product/service introduction. The notification generates interest and builds an excitement (or "buzz") for the movie, television program, sporting event, new product/service, or other event/activity. The notification also builds suspense and helps drive sales for the event itself as well as related products or services.

Certain notifications are sent at regular intervals, such as updates for a particular event or activity. These updates may be sent daily, weekly, monthly, or at any other interval. Notifications can be sent at one or more predetermined time periods prior to an event, such as seven days before the event, two days before the event, and again the day before the event. In a particular implementation, notifications are sent shortly before the start of a television program, such as one hour or two hours before the program start time. In certain embodiments, viewers may select the frequency and timing of the notifications they receive. Other notifications can be sent as soon as new information is available (e.g., when a product release date is announced or when an update regarding an actor/actress or other individual is received).

Sending of notifications may vary depending on the time zone in which the recipient lives, as determined, for example, by the area code of the recipient's phone number. For example, notifications are sent to recipients at 7:00 pm local time, which causes the same notification to be sent at the appropriate time that corresponds to 7:00 pm in the recipient's local time zone.

In a particular embodiment, a caller contacts a service that allows the caller to purchase tickets to a movie or other event, or to check show times (e.g., when is "Iron Man" playing at the Main Street Theater tomorrow). The caller requests tickets or other information for a particular movie or event. The described systems and methods select an advertisement related to the movie or event identified by the caller, such as a related movie or related products/services. The advertisement is provided to the caller. The caller is then given the option of receiving a reminder within a few days of the release date of a related movie or event, or receiving a reminder regarding another product or service. The reminder can be a text message to a mobile device, a phone call that provides an audio message (reminder) to the caller, an email message, a fax message, or any other reminder using any communication mechanism.

The advertisement provided to each caller is targeted to that caller based on information known about the caller. This information includes the particular movie or event requested by the caller, previous requests by the same caller, and other information known about the caller, such as age, buying patterns, movie preferences, and so forth. Targeted advertisements are less likely to be an annoyance to callers because there is a strong likelihood that the caller has an interest in the content of the advertisement. Thus, increased knowledge about the caller can benefit the advertiser with an improved response rate and benefit the caller by reducing the number of non-interesting advertisements received.

Although particular examples discussed herein relate to purchasing tickets to a movie or other event, alternate embodiments may apply these same systems and methods to other activities, products, or services.

FIG. 1 is a block diagram illustrating an example environment 100 for handling incoming calls and providing advertisements and other information to callers. A call processing system 102 receives incoming calls from any number of callers and handles the processing of the incoming calls. This processing includes, for example, playing a welcome greeting, playing a list of options for the caller, providing advertisements to the caller, requesting information from the caller, placing the caller on hold (if necessary), and requesting one or more advertisements from an advertisement management module 104. When requesting advertisements from advertisement management module 104, call processing system 102 provides information known about the caller to the advertisement management module. This caller information includes, for example, a caller's name and/or phone number, an option selected by the caller (e.g., selected from the list of options provided by call processing system 102), information provided by the caller (verbally or via key pad entries on the caller's phone), and the type of phone the caller is using (e.g., mobile phone or "land line" phone).

Advertisement management module 104 is coupled to one or more advertisement sources 106, an advertisement database 108, a caller information database 110, and a telephone number data source 112. Advertisement management module 104 selects one or more advertisements for playback by call processing system 102 based on caller information, available advertisements, and the like. Example advertisement sources 106 include movie ticket sales companies, movie theaters, product suppliers, service suppliers, advertising agencies, and so forth. Advertisement database 108 stores advertisements received from advertisement sources 106 along with additional information associated with the advertisements, such as the associated supplier and a category (e.g., movie type and movie information such as key actors) associated with the advertisement. Caller information 110 includes other known information about the caller, such as previous movie preferences, preferred theaters, ticket purchase quantity and other buying habits, caller phone type, and the like. Telephone number data source 112 includes information about various phone numbers, phone number prefixes, and the like. This information is useful in determining a caller's identity, the type of phone used by the caller (mobile phone or "land line" phone), and similar information.

Figure 2:
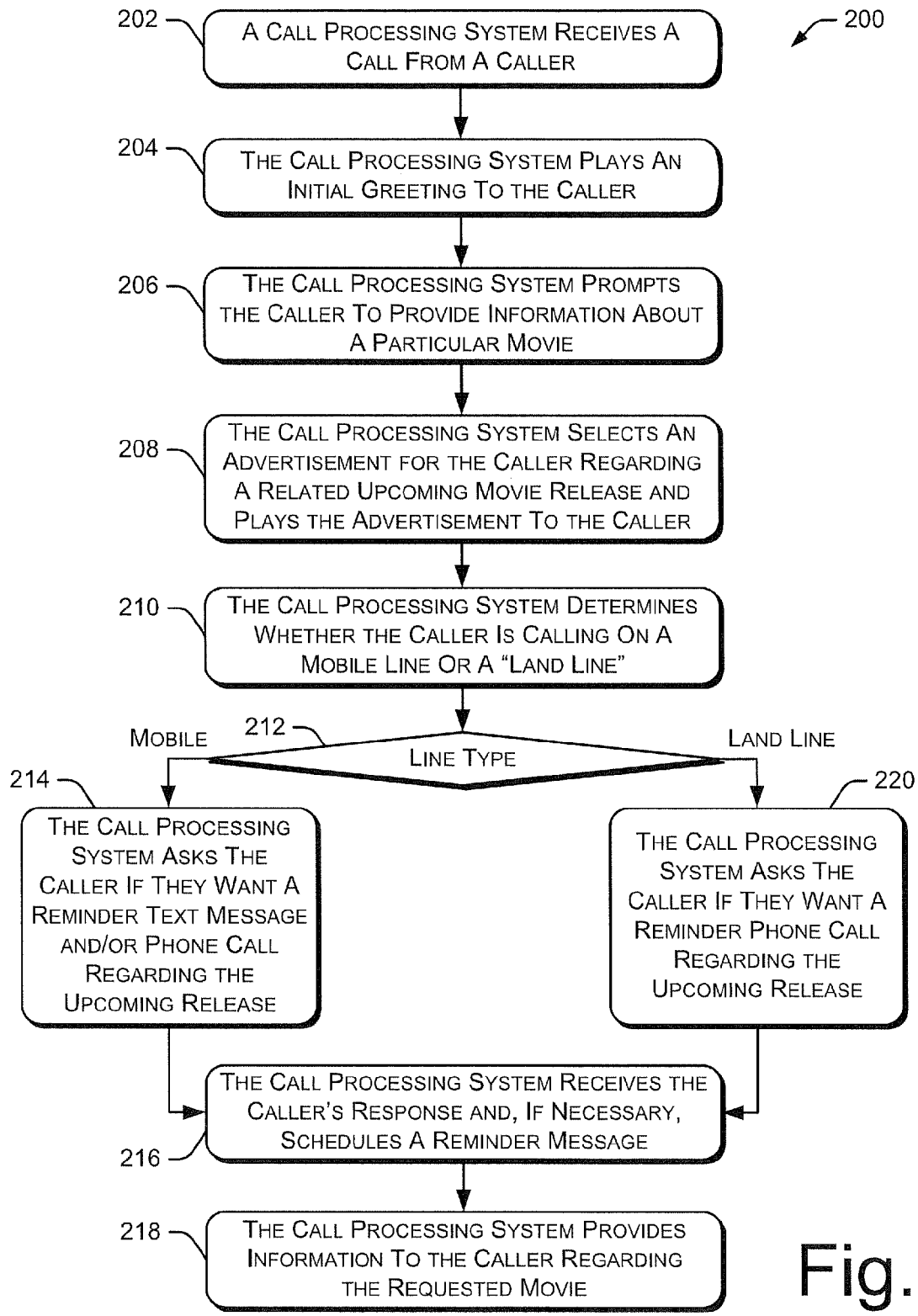
FIG. 2 is a flow diagram depicting an embodiment of a procedure for processing an incoming call.

FIG. 2 is a flow diagram illustrating an embodiment of a procedure 200 for processing an incoming call. In one embodiment, procedure 200 is implemented in the environment shown in FIG. 1. In other embodiments, procedure 200 is implemented using one or more computing devices or other systems capable of performing the operations shown in FIG. 2.

Initially, a call processing system (e.g., call processing system 102 shown in FIG. 1) receives a call from a caller (block 202). The call processing system identifies the caller's area code and phone number prefix, and matches that against a database of mobile versus landline phones. Depending on the type of phone, a different call path could be taken. Then, the call processing system plays an initial greeting to the caller (block 204) and potentially a generic sponsorship ad. In one embodiment, the caller has called to purchase a ticket to a movie or other event. Procedure 200 continues to block 206 as the call processing system prompts the caller to provide information about a particular movie or event (e.g., the movie or event for which the caller wants to hear show times or to purchase tickets). The caller may provide the title of the movie or other identifying information about the movie or event. Alternatively, the caller may ask "What movies are playing at 8 pm tonight?"

Procedure 200 continues by selecting an advertisement for the caller regarding a related upcoming movie release, and plays the selected advertisement to the caller (block 208). A "related" upcoming movie release may be of the same or similar genre, similar movie rating, similar content, similar actors, similar directors, and the like. The call processing system may request the advertisement from an advertisement management module, such as advertisement management module 104 shown in FIG. 1. The advertisement selection process is discussed below with respect to FIG. 3. A record is maintained that identifies the number of times each advertisement is played, and identifies phone numbers of the callers that received each advertisement. This data is useful in billing advertisers for playing their advertisements and providing advertisers with a list of advertisement recipients (i.e., callers that received the advertisement).

Next, the call processing system determines whether the caller is calling on a mobile line or a "land line" (block 210). As discussed below, this distinction will determine the options made available to the caller to receive a reminder about the movie or other product/service identified in the advertisement. If the caller is calling on a mobile line, the procedure branches to block 214 where the call processing system asks the caller if they want to receive a reminder text message and/or reminder phone call regarding the upcoming movie release. For example, the user may request to receive a text message reminding them of a new movie release one day prior to the release. Alternatively, the caller may request to receive an audio message as a reminder of the new movie release. The caller may also select both a text message and an audio message, or may choose not to receive any reminder. In other embodiments, the caller may request an email reminder, fax reminder, or other type of reminder. Alternatively, reminders can be sent to a social network site (e.g., writing on the caller's Facebook™ Wall or other social network page), or sent via a message to the caller's voice blog widget on MySpace™ or similar site/page. Another feature automatically enters the reminder data into the caller's calendar (such as their Google™ Calendar, Facebook Calendar, or a calendar on their cell phone) or by sending an appointment to the caller's Outlook™ Calendar to record the reminder.

In an alternate embodiment, the function performed at block 210 is performed earlier in procedure 200. For example, the function performed at block 210 can be performed immediately after receiving a call at block 202.

If, at block 212, the caller is calling on a "land line", the procedure branches to block 220 where the call processing system asks the caller if they want to receive a reminder phone call regarding the upcoming movie release. As discussed above with respect to block 214, the caller may request to receive an audio message as a reminder of the new movie release. Optionally, the caller may also request an email reminder, fax reminder, or other type of reminder. In this example, the caller using a "land line" is not offered the option of receiving a text message because "land lines" are not typically capable of receiving text messages of the type received by mobile phones and other portable communication devices. In alternate embodiments, the caller may request a text message or similar reminder message if their phone supports receipt of such messages, regardless of the type of communication link used by the phone.

Procedure 200 continues by receiving a response from the caller regarding whether the caller wants to receive a reminder of the new movie release (block 216). If the caller has requested to receive a reminder message (text, audio, or other format), the call processing system schedules that reminder message on the appropriate day (i.e., one day before the movie release date). Next, the call processing system provides information to the caller regarding the requested movie (block 218).

The following example is provided to illustrate one possible use of the system and method described herein. The call processing system provides a prompt to the caller "Thank you for calling Movie Tickets Express today—your source for tickets to new movie releases and other great events. Please tell us the movie or event you are looking for." The user may respond "I want tickets to the Iron Man movie tomorrow." The call processing system identifies other movies related to "Iron Man". For example, the call processing system may identify advertisements related to other comic-action movies, upcoming movies that include the "Iron Man" character, and so forth. In this example, the selected advertisement states "Did you know that Iron Man will be appearing in the upcoming movie The Incredible Hulk—which will be released on June 13. Press 1 for a text message reminder about The Incredible Hulk movie, Press 2 for an audio message reminder, or Press 3 to get a notification to your Facebook calendar. The caller then makes the appropriate selection. If the caller selects option 1, 2, or 3, the appropriate reminder is scheduled for that caller. In this example, the reminder will be a message sent on June 12 that reminds the caller of the movie release "The Incredible Hulk" on June 13. If the caller presses "3", the system will prompt the caller for more information, such as an email address or FaceBook ID. If the caller does not make a selection within a predetermined time, the system will continue without scheduling a reminder.

An example reminder message sent on June 12 states "Iron Man appears in the Hulk movie, which starts tomorrow. Watch the Hulk take on a monstrous new adversary called The Abomination." The reminder message includes a clickable phone number that is specifically used for that movie (the Incredible Hulk). The phone user can learn more about the movie (show times and theaters), buy tickets to the movie, and so forth by clicking the phone number contained in the reminder message. During that phone call for information about the Incredible Hulk, another advertisement can be played to the caller that offers another reminder for a future movie (or event) that is related to the Incredible Hulk movie.

In addition to the reminder message sent on June 12, the caller can receive an immediate reminder—sent immediately after purchasing their Iron Man tickets. An example message states "Iron Man will make an appearance in the Incredible Hulk movie, in theaters on June 13th. We'll send you a reminder message on June 12th."

Figure 3:
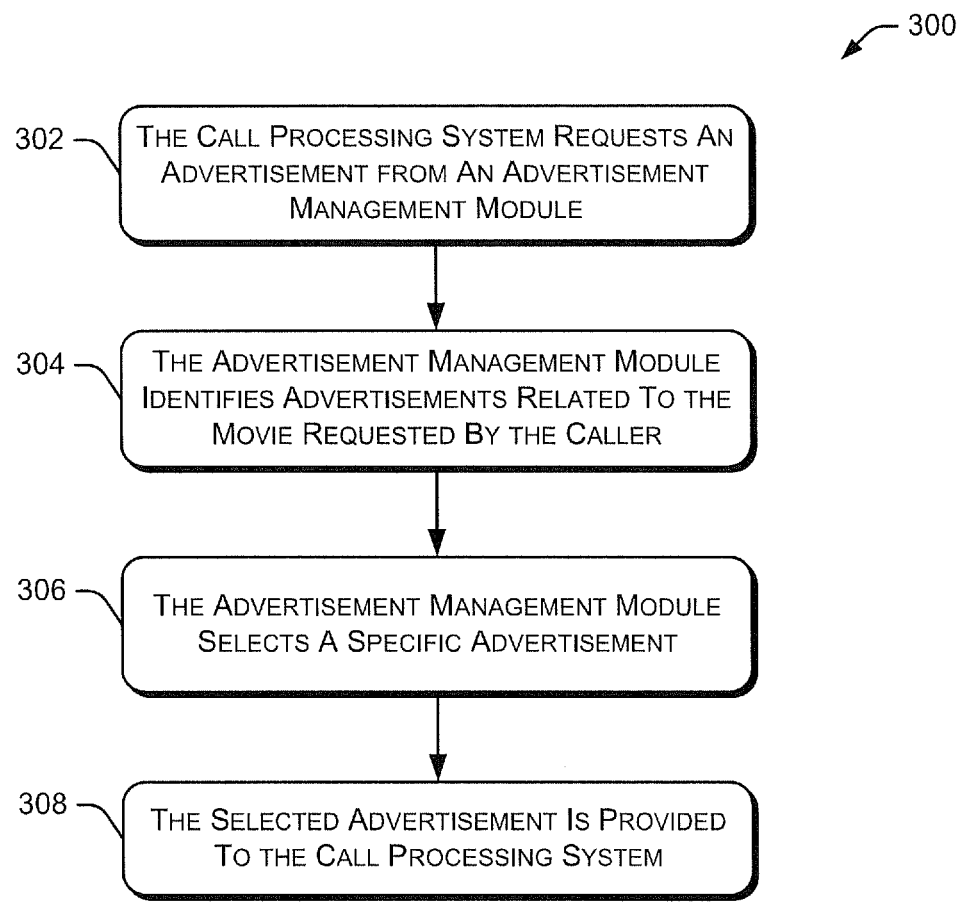
FIG. 3 is a flow diagram depicting an embodiment of a procedure for selecting advertisements to play to a caller.

FIG. 3 is a flow diagram illustrating an embodiment of a procedure 300 for selecting advertisements to play to a caller. In one embodiment, procedure 300 is implemented in the environment shown in FIG. 1. In other embodiments, procedure 300 is implemented using one or more computing devices or other systems capable of performing the operations shown in FIG. 3.

Initially, the call processing system requests an advertisement from the advertisement management module (block 302). The advertisement management module identifies advertisements related to the movie or event requested by the caller (block 304). The identification of related advertisements can be made based on movies or events having similar genres, ratings, actors, producers, directors, themes, and the like. Related advertisements may also be for different products or services that may be of interest to the caller (such as products and services associated with the movie (or other movies) or associated with characters in the movie—web sites, books, DVDs, CDs, and so forth). Additionally, an advertisement may be related to another movie being released the following week. For example, if someone asks for information about the movie "Indiana Jones", they might receive an advertisement for the "National Treasure" DVD being released the following week.

Based on the advertisements identified in block 304, the procedure continues by selecting a specific advertisement to play to the caller (block 306). Various systems are used to select among multiple identified advertisements. One embodiment uses a round-robin approach. Other embodiments associate a specific advertisement with a specific movie request. Another embodiment allows advertisers to bid on the price they are willing to pay to have their advertisement played to callers. The advertisement with the highest bid gets played to the caller. Other embodiments may utilize any type of selection process.

The selected advertisement is then provided by the advertisement management module to the call processing system (block 308). The call processing system plays the received advertisement to the caller.

In alternate embodiments, similar systems and methods can be used in an auction system. For example, when a caller uses a phone to place an auction bid, the caller may be given the option to receive a notification (via text message, audio message, or other format) when a similar type of product or service is listed with the auction service in the future.

Figure 4:
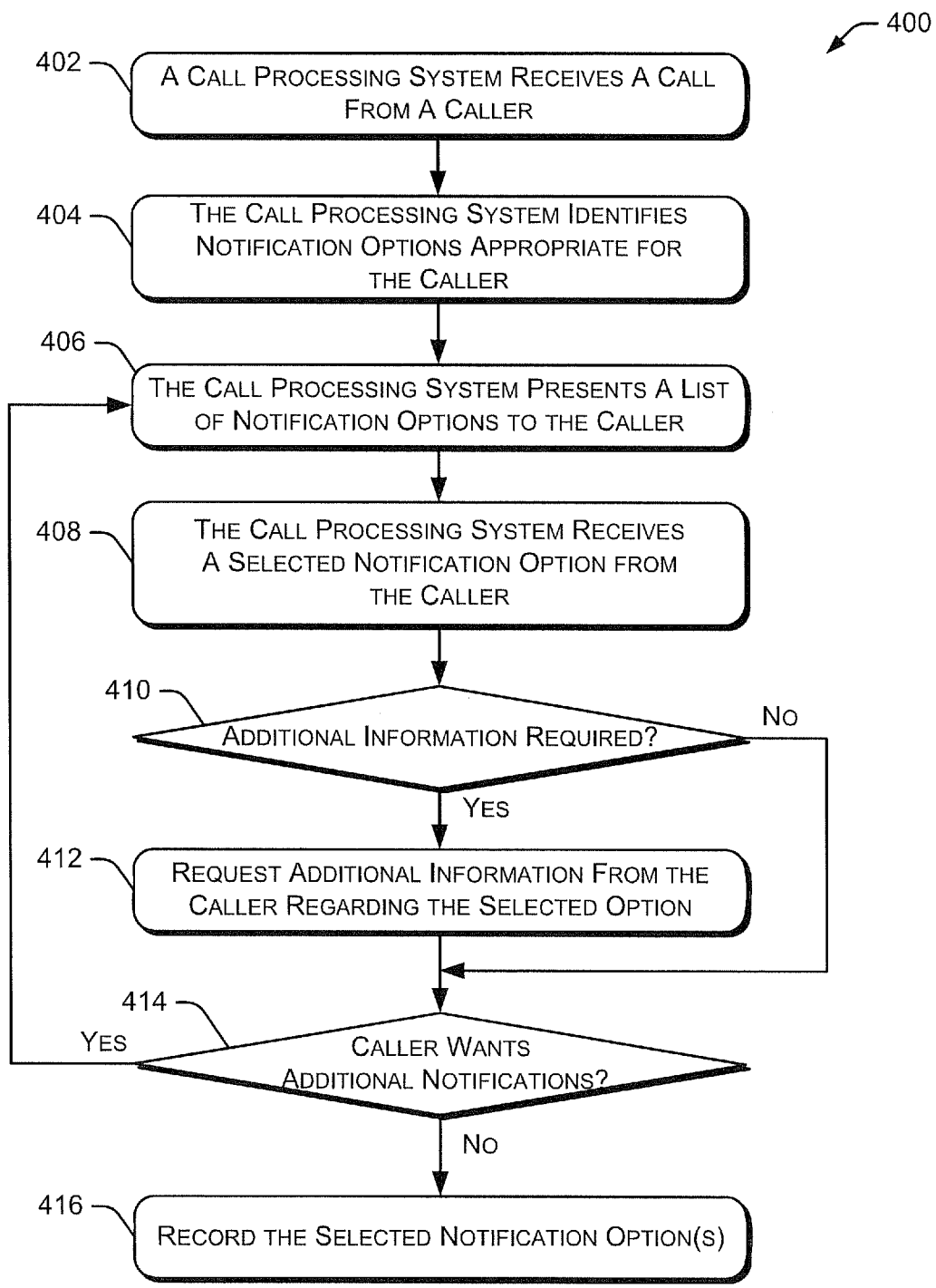
FIG. 4 is a flow diagram depicting an embodiment of a procedure for selecting one or more notification options.

FIG. 4 is a flow diagram depicting an embodiment of a procedure 400 for selecting one or more notification options. Initially, a call processing system receives a call from a caller (block 402). The call processing system then identifies notification options appropriate for the caller (block 404). These notification options can vary, for example, depending on the caller's communication service provider, phone type (and related features/capabilities), whether the caller is calling on a cellular phone or a land line, and so forth. A caller with an advanced cellular phone may be able to receive email, voicemail, text messages, graphic messages, and more via their cellular phone. However, a caller with a limited-feature cellular phone may be limited to simple text messages and voicemail messages.

The call processing system presents a list of notification options to the caller (block 406). These notification options include, for example, reminders of upcoming events, upcoming movies, upcoming television programs and the like. Notification options may also include event previews, insider information, exclusive information for callers opting-in to the notification, player updates, character updates and so forth.

Procedure 400 continues as the call processing system receives a selected notification option from the caller (block 408). Depending on the selected notification option, the call processing system may require additional information to provide the desired notification to the caller. For example, if the caller wants notifications related to a particular television program, the caller may have the option to select among multiple notifications (e.g., character updates, related programs and insider information). Additionally, if the caller selects a reminder notification before each episode of a particular television program, the caller may select the time at which the notification is provided, such as one hour before the program starts or some other time period.

If additional information is required from the caller at block 410, the procedure requests the additional information from the caller regarding the selected option (block 412). If no additional information is required form the caller at block 410, the procedure continues to block 414, which determines whether the caller wants to select additional notifications. If the caller wants to receive additional notifications, procedure 400 returns to block 406, which presents the list of notification options to the caller. If the caller does not want to receive additional notifications, the procedure records the selected notification option(s) (block 416). The call processing system then provides the selected notifications to the caller at the appropriate times.

In particular embodiments, a caller sets notifications related to their favorite television programs, movies, movie categories, sporting events, teams, actors/actresses, and related events, activities and individuals. These notifications may provide inside information, advanced notice of information, team updates, plot updates, team injury reports, team scouting reports and the like. Notifications can be provided to callers via email, text messages, voice messages, submissions to social media sites and the like.

In one embodiment, notifications related to a particular television program may provide previews of upcoming episodes, things to watch for in specific episodes, reminders of upcoming programs and information regarding characters in the television program. These notifications provide an improved entertainment experience for the viewer and build a fan base for the television program.

Figure 5:
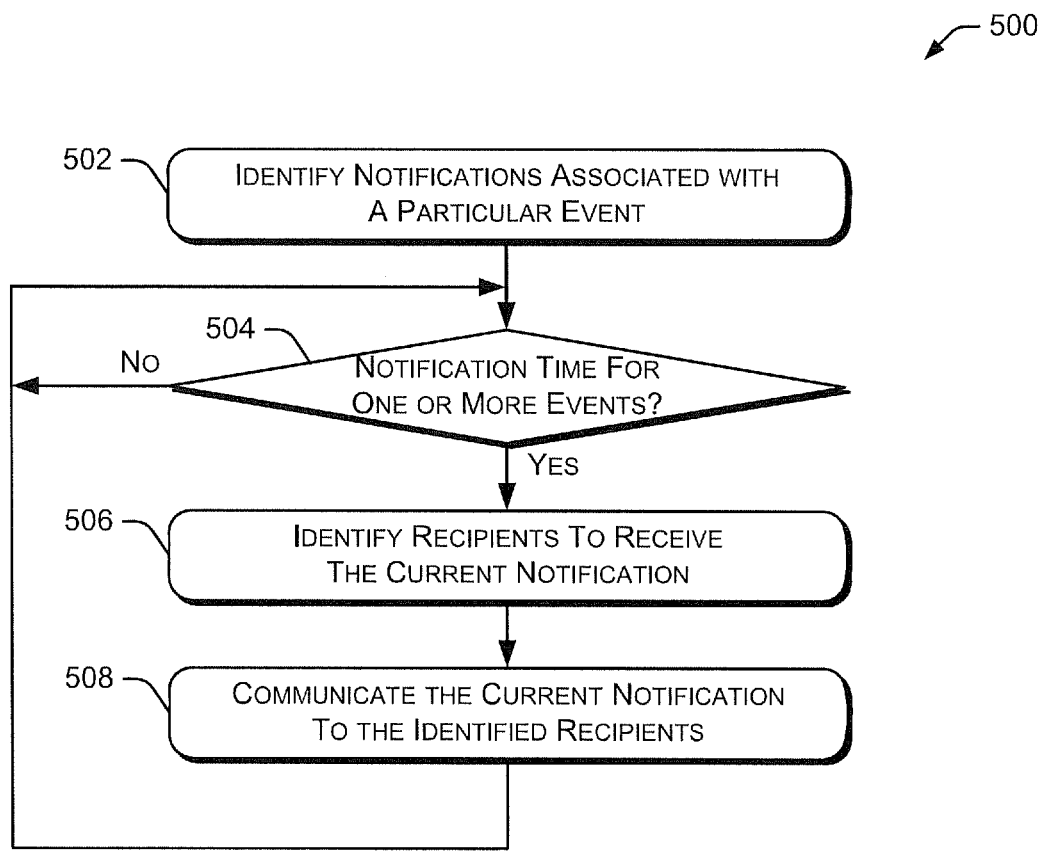
FIG. 5 is a flow diagram depicting an embodiment of a procedure for communicating notifications to one or more recipients.

FIG. 5 is a flow diagram depicting an embodiment of a procedure 500 for communicating notifications to one or more recipients. Initially, the procedure identifies one or more notifications associated with a particular event (block 502). The notifications have an associated time at which they are to be communicated to one or more recipients. The associated time can be a particular time, such as 7:00 pm, or a relative time, such as two hours before an event starts or ten minutes after an event finishes. The time a notification is sent may be represented in local time, such as 7:00 pm at the geographic location of the recipient (e.g., based on the recipient's area code or other information). Thus, a recipient in one time zone may receive the notification at 7:00 pm in their local time zone, while another recipient receives the same notification an hour later if they are located in an adjacent time zone with a one hour differential.

Procedure 500 continues by determining whether the current time is the notification time for sending one or more notifications (block 504). If the current time is not associated with any notification times, the procedure waits until the current time matches one or more notification times. If the current time is associated with one or more notification times, the procedure continues to block 506, which identifies one or more recipients to receive the current notification (i.e., the notification associated with the current time). The current notification is then communicated to the identified recipients (block 508). The current notification can be communicated via text message, audio message, email, facsimile, or any other communication format or protocol. The procedure then returns to block 504 and waits until the current time matches another notification time.

Figure 6:
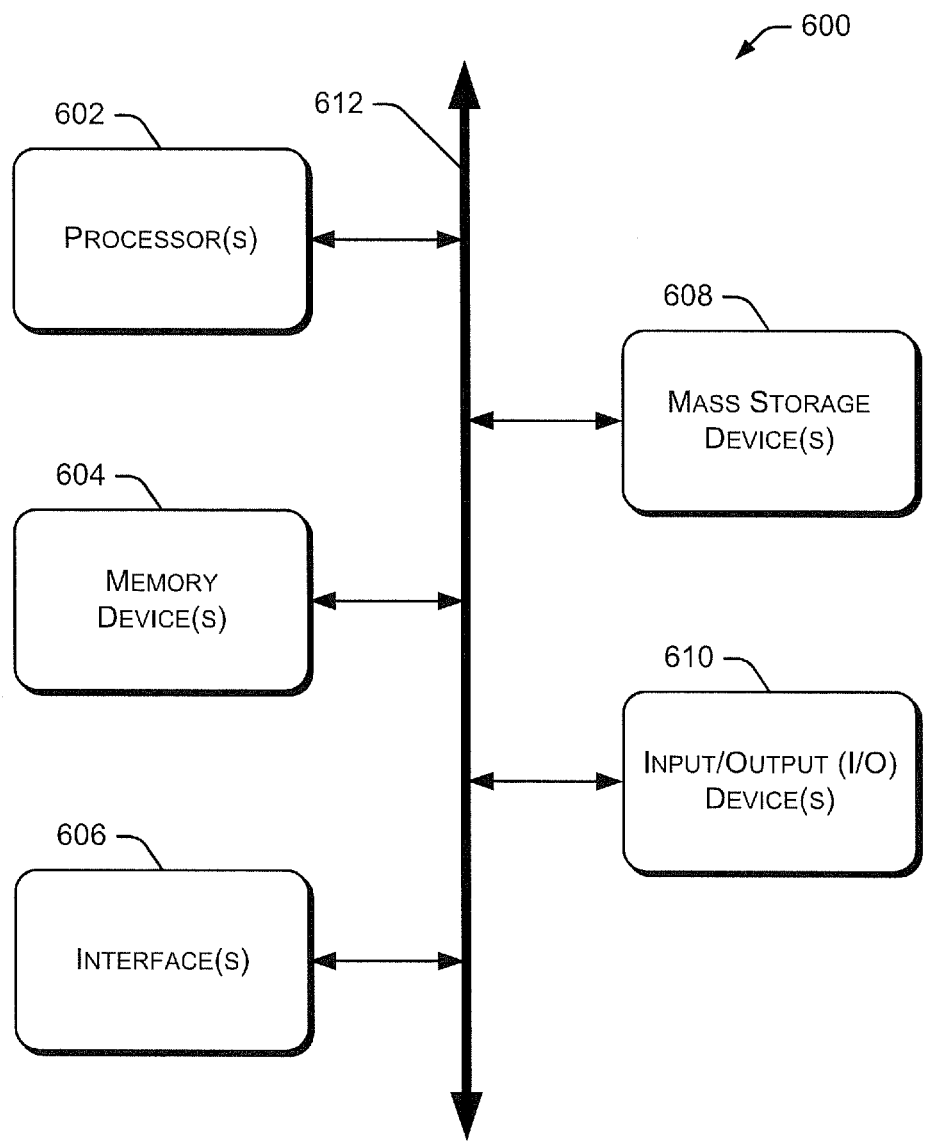
FIG. 6 depicts a block diagram of an example computing device.

FIG. 6 depicts a block diagram of an example computing device 600. Computing device 600 may be used to perform various procedures, such as those discussed herein. Computing device 600 can function as a server, a client, or any other computing entity. Computing device 600 can be any of a wide variety of computing devices, such as a desktop computer, a notebook computer, a server computer, a handheld computer, and the like.

Computing device 600 includes one or more processor(s) 602, one or more memory device(s) 604, one or more interface(s) 606, one or more mass storage device(s) 608, and one or more Input/Output (I/O) device(s) 610, all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM)) and/or nonvolatile memory (e.g., read-only memory (ROM)). Memory device(s) 604 may also include rewritable ROM, such as Flash memory. Mass storage device(s) 608 include various computer readable media, such as magnetic tapes, magnetic disks, optical disks, solid state memory (e.g., Flash memory), and so forth. Various drives may also be included in mass storage device(s) 608 to enable reading from and/or writing to the various computer readable media. Mass storage device(s) 608 include removable media and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Interface(s) 606 include various interfaces that allow computing device 600 to interact with other systems, devices, or computing environments. Example interface(s) 606 include any number of different network interfaces, such as interfaces to local area networks (LANs), wide area networks (WANs), wireless networks, and the Internet.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the system and method described herein facilitate handling of reminder messages and related functions. Additionally, some embodiments may be used in conjunction with one or more conventional call processing or messaging systems and methods. Particular embodiments may be used as an improvement of existing call processing or messaging systems and methods.

Although the components and modules illustrated herein are shown and described in a particular arrangement, the arrangement of components and modules may be altered to perform call processing, messaging, or other functions in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
receiving a call from a caller, wherein the caller is calling regarding a particular event;
identifying notification options appropriate for the caller, wherein identifying notification options appropriate for the caller includes determining a communication service provider associated with a communication device used by the caller;
presenting a list of notification options to the caller;
receiving a selected notification option from the caller;
if additional information regarding the selected notification option is necessary to schedule the selected notification, requesting additional information from the caller regarding the selected notification option; and
scheduling a notification message associated with the selected notification option.

2. A non-transitory computer-readable storage medium comprising instructions that, when executed by at least one processor, cause the at least one processor to perform operations comprising:
receiving a call from a caller, wherein the caller is calling regarding a particular event;
identifying notification options appropriate for the caller, wherein identifying notification options appropriate for the caller includes determining a communication service provider associated with a communication device used by the caller;
presenting a list of notification options to the caller;
receiving a selected notification option from the caller;
if additional information regarding the selected notification option is necessary to schedule the selected notification, requesting additional information from the caller regarding the selected notification option; and
scheduling a notification message associated with the selected notification option.

3. The non-transitory computer-readable storage medium of claim 2, wherein the particular event is a movie.

4. The non-transitory computer-readable storage medium of claim 2, wherein presenting a list of notification options to the caller includes offering a plurality of reminder types to the caller.

5. The non-transitory computer-readable storage medium of claim 2, wherein
presenting a list of notification options to the caller includes offering a text message reminder and an audio message reminder to the caller.

6. The method of claim 1, wherein the particular event is a movie.

7. The method of claim 1, wherein presenting a list of notification options to the caller includes offering a plurality of reminder types to the caller.

8. The method of claim 1, wherein presenting a list of notification options to the caller includes offering a text message reminder and an audio message reminder to the caller.

9. The method of claim 1, wherein the notification option is a text message sent to a communication device used by the caller to initiate the received call.

10. The method of claim 1, wherein the notification option is a graphical image sent to a communication device used by the caller to initiate the received call.

11. The method of claim 1, wherein the notification option includes exclusive information regarding the particular event.

* * * * *